United States Patent
Chun

(10) Patent No.: US 8,217,983 B2
(45) Date of Patent: Jul. 10, 2012

(54) VIDEO COMMUNICATION TERMINAL AND METHOD OF ROAD GUIDANCE USING THE SAME

(75) Inventor: Jae Woong Chun, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 890 days.

(21) Appl. No.: 12/325,397

(22) Filed: Dec. 1, 2008

(65) Prior Publication Data
US 2009/0141118 A1  Jun. 4, 2009

(30) Foreign Application Priority Data
Dec. 4, 2007  (KR) .................. 10-2007-0124761

(51) Int. Cl.
*H04N 7/14* (2006.01)

(52) U.S. Cl. ............... 348/14.07; 348/14.08; 348/14.12
(58) Field of Classification Search .... 348/14.01–14.16; 701/412, 439, 446, 117; 340/988, 989, 990, 340/995.29
See application file for complete search history.

(56) References Cited

U.S. PATENT DOCUMENTS
7,633,517 B2 * 12/2009 Yim ........................... 348/14.08
2006/0122772 A1 * 6/2006 Lee et al. ...................... 701/211
* cited by examiner Primary Examiner — Melur Ramakrishnaiah
(74) Attorney, Agent, or Firm — Jefferson IP Law, LLP

(57) ABSTRACT

The present invention relates to a video communication terminal and a method of providing road guidance using the same. More specifically, the present invention provides a road guidance service to a user during video communication by transmitting the user's location information to a user of a correspondent video communication terminal and receiving road guidance information from the correspondent video communication terminal. The method of road guidance includes requesting, by a first video communication terminal road guidance, to a second video communication terminal through video communication, transmitting, if the first video communication terminal receives a signal accepting to provide the road guidance from the second video communication terminal, a location value of the first video communication terminal to the second video communication terminal and displaying a map including the location of the first video communication terminal in the second video communication terminal. A user of the video communication terminal may thereby receive precise road guidance, without an invasion of the user's privacy.

22 Claims, 6 Drawing Sheets

VIDEO COMMUNICATION TERMINAL AND METHOD OF ROAD GUIDANCE USING THE SAME

PRIORITY

This application claims the benefit under 35 U.S.C. §119(a) of a Korean patent application filed in the Korean Intellectual Property Office on Dec. 4, 2007 and assigned Serial No. 2007-0124761, the entire disclosure of which is hereby incorporated by reference.

BACKGROUND OF THE INVENTION

1. Field of the Invention

The present invention relates to video communication technology. More particularly, the present invention relates to a video communication terminal for providing directions while performing video communication and a method of using the same.

2. Description of the Related Art

Recently, in addition to a voice communication function, communication terminals have been provided with the ability of transmitting and receiving data at a high speed. With the ability to realize high speed data communication, technology for video communication has attracted considerable attention. That is, in conventional wired and wireless communication networks, functions related to video communication are not satisfactory due to problems in data transmission speed and compatibility with existing networks. With the development of newer data transmission technology, such as Wideband Code Division Multiple Access (WCDMA) and High-Speed Downlink Packet Access (HSDPA), the video communication terminal is developing to a level of commercialization.

However, technology for video communication using the video communication terminal is still at an initial stage, providing a voice communication while displaying an image of a user of the correspondent video communication terminal.

SUMMARY OF THE INVENTION

An aspect of the present invention is to address at least the above-mentioned problems and/or disadvantages and to provide at least the advantages described below. Accordingly, an aspect of the present invention is to provide a road guidance service during video communication by transmitting a user's location information to a correspondent video communication terminal and receiving road guidance information from the correspondent video communication terminal.

In accordance with an aspect of the present invention, a method of providing road guidance using a video communication terminal is provided. The method includes requesting, by a first video communication terminal, road guidance to a second video communication terminal through video communication, transmitting, if the first video communication terminal receives a signal accepting to provide the road guidance from the second video communication terminal, location data of the first video communication terminal to the second video communication terminal and displaying a map including the location of the first video communication terminal in the second video communication terminal.

In accordance with another aspect of the present invention, a video communication terminal is provided. The terminal includes a wireless communication unit for performing video communication with a correspondent video communication terminal, a display unit for displaying an image of a user of the correspondent video communication terminal while performing the video communication, a GPS receiver for determining the current location of the video communication terminal by receiving signals from at least one GPS satellite, an input unit for inputting a road guidance request signal while performing the video communication and a control unit for transmitting the input road guidance request signal to the correspondent video communication terminal through video communication, and for transmitting, if a signal accepting to provide the road guidance request is received from the correspondent video communication terminal through the video communication, the current location to the correspondent video communication terminal through the video communication.

In accordance with still another aspect of the present invention, a video communication terminal is provided. The terminal includes a wireless communication unit for performing video communication with a correspondent video communication terminal, a display unit for displaying an image of a user of the correspondent video communication terminal while performing the video communication and a control unit for accepting a road guidance request from the correspondent video communication terminal while performing the video communication and controlling to display a map including the current location of the correspondent video communication terminal.

In accordance with an aspect of the present invention, a user may receive road guidance from a correspondent video communication terminal by transmitting the user's current location to the correspondent video communication terminal. In particular, because the correspondent video communication terminal can provide road guidance by viewing the current location of the user who requested the road guidance, the user may receive more precise road guidance than by referring only to a map displayed in the video communication terminal. Further, because the current location of the user is transmitted to the correspondent video communication terminal according only to a request from the user, an invasion of individual privacy can be avoided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
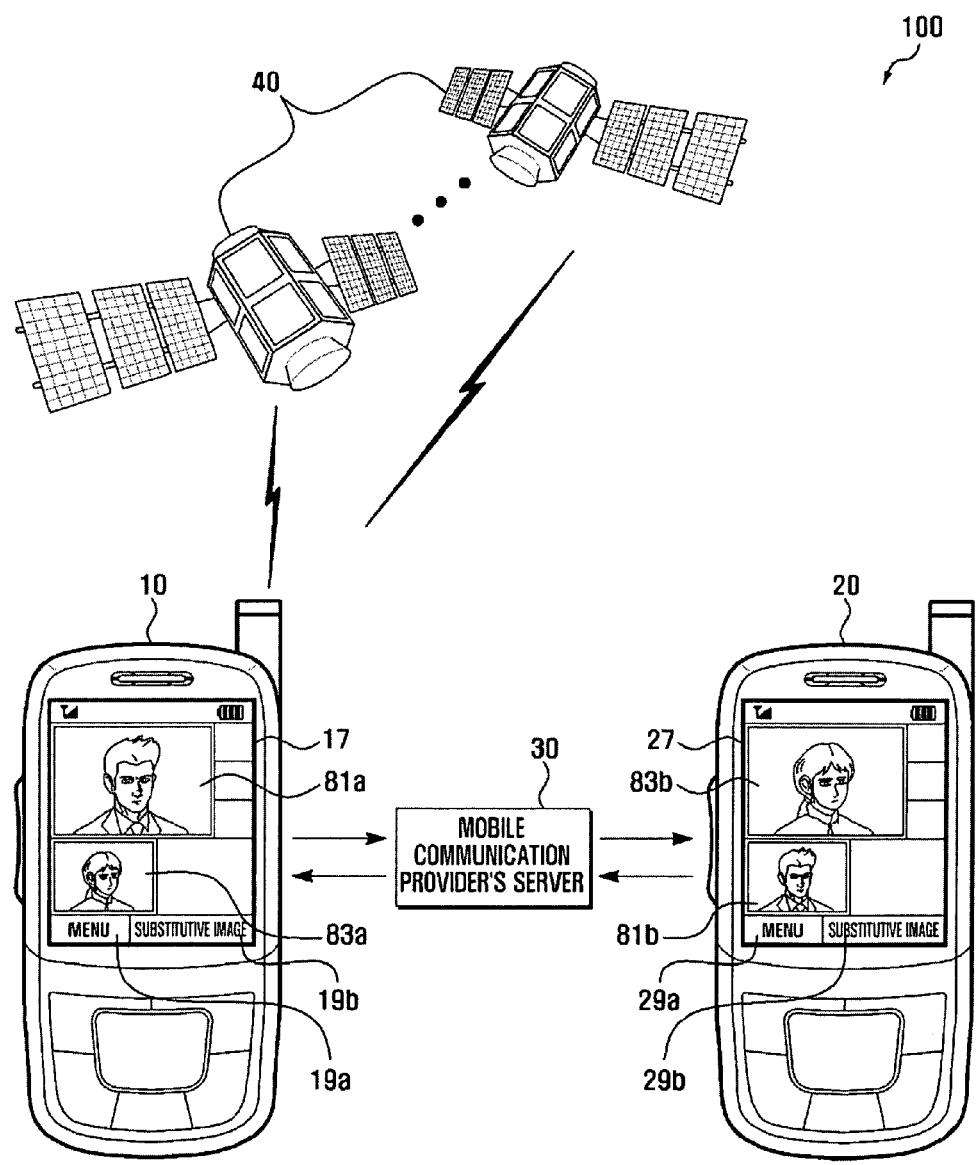
FIG. 1 is a schematic view showing a configuration of a video communication system according to an exemplary embodiment of the present invention.
Figure 2:
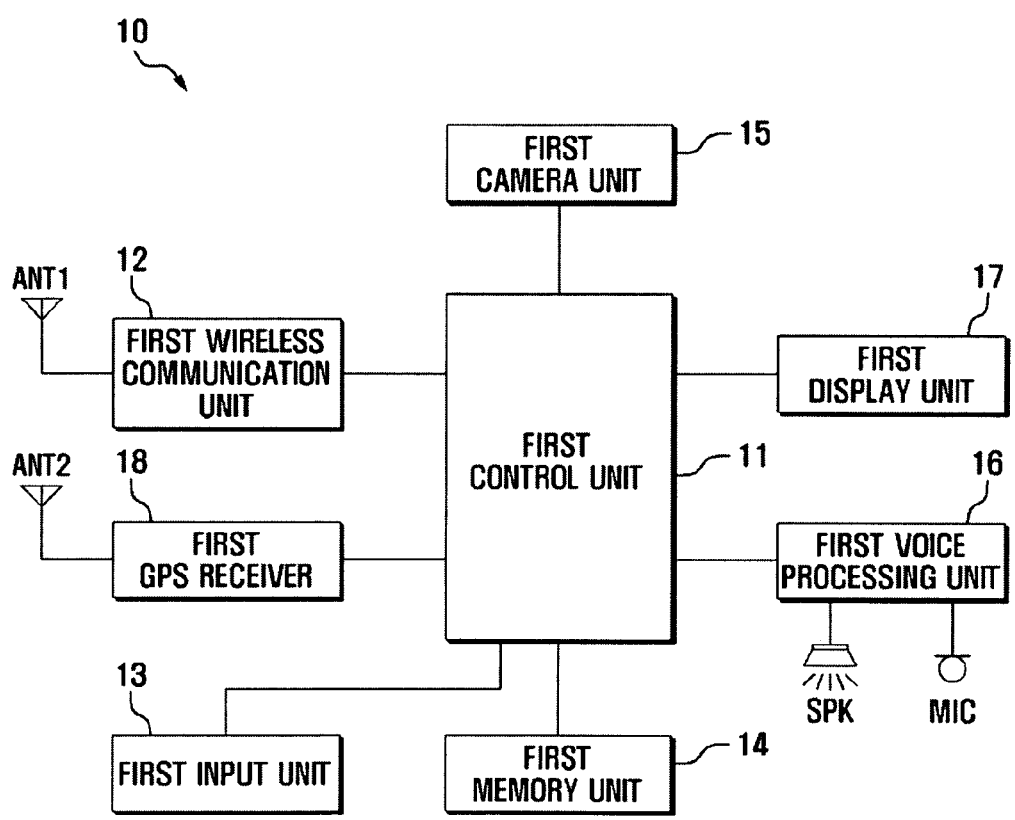
FIG. 2 is a block diagram showing a configuration of a first video communication terminal in the video communication system of FIG. 1.
Figure 3:
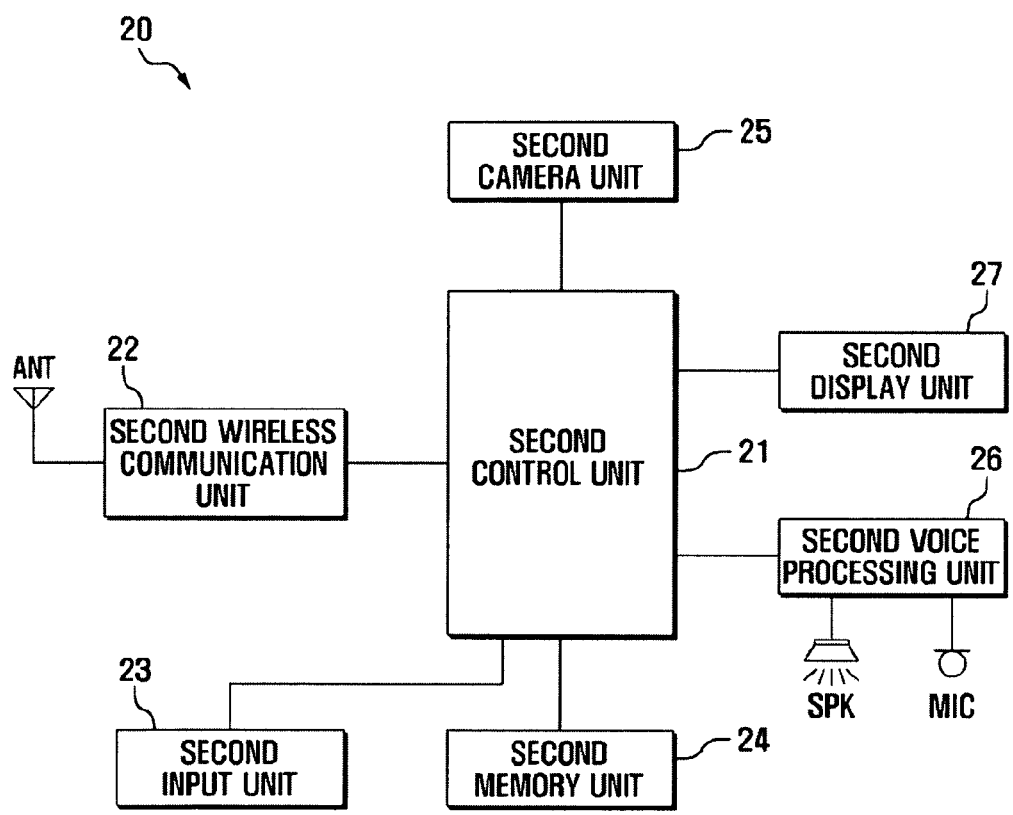
FIG. 3 is a block diagram showing a configuration of a second video communication terminal in the video communication system of FIG. 1.

FIG. 1 is a schematic view showing a configuration of a video communication system according to an exemplary embodiment of the present invention. FIG. 2 is a block diagram showing a configuration of a first video communication terminal in the video communication system of FIG. 1. FIG. 3 is a block diagram showing a configuration of a second video communication terminal in the video communication system of FIG. 1. In the following description, the term "road guidance" refers to directions that are provided to a user in order to assist the user in navigation.

Referring to FIGS. 1 to 3, a video communication system 100 according to an exemplary embodiment of the present invention includes a first video communication terminal 10, a second video communication terminal 20, a mobile communication provider's server 30, and a plurality of Global Positioning System (GPS) satellites 40.

In an exemplary implementation of the present invention, a user of the first video communication terminal 10 (hereafter, 'first user') requests a user of the second video communication terminal 20 (hereafter, 'second user') for road guidance through video communication. The second user accepts to provide the road guidance requested by the first user, and the second video communication terminal 20 transmits a road guidance voice of the second user to the first video communication terminal 10 through the video communication.

In the illustrated example of FIGS. 1 to 3, video communication occurs between the first video communication terminal 10 and the second video communication terminal 20. That is, the video communication occurs between two video communication terminals. However, it is to be understood that this is merely for clarity and more than two video communication terminals may be connected through the mobile communication provider's server 30 for multilateral video communication. In such a case, each user may receive road guidance voices from other video communication terminals connected through the mobile communication provider's server 30.

As will be discussed in more detail below, each of the first video communication terminal 10 and the second video communication terminal 20 includes a wireless communication unit (respectively 12 and 22) for video communication. The communication terminal may be a mobile phone, a smart phone, a video phone, an International Mobile Telecommunication 2000 (IMT-2000) terminal, a WCDMA terminal, a Universal Mobile Telecommunication Service (UMTS) terminal, a Personal Digital Assistant (PDA), a Portable Multimedia Player (PMP), a Digital Multimedia Broadcasting (DMB) terminal, and a personal computer such as a desktop computer and a notebook computer. However, in this exemplary embodiment, the first video communication terminal 10 and the second video communication terminal 20 are embodied as mobile phones.

The mobile communication provider's server 30 relays video communication between the first video communication terminal 10 and the second video communication terminal 20. In particular, if location information is received from the first video communication terminal 10, the mobile communication provider's server 30 transmits a map including the current location of the first video communication terminal 10 to the second video communication terminal 20 instead of transmitting an image of the first user.

An exemplary first video communication terminal 10 is now described in more detail referring to FIGS. 1 and 2. The first video communication terminal 10 includes a first control unit 11, a first wireless communication unit 12, a first input unit 13, a first memory unit 14, a first camera unit 15, a first voice processing unit 16, a first display unit 17, and a first GPS receiver 18.

The first control unit 11 includes a microprocessor for controlling general operation of the first video communication terminal 10. Also, the first control unit 11 controls the provision of a road guidance service to the first user during video communication with another video communication terminal, for example the second video communication terminal 20.

The first wireless communication unit 12 performs communication with another user, for example the second video communication terminal 20. The first wireless communication unit 12 transmits and receives video communication information for performing the video communication through an antenna (ANT1). That is, the first wireless communication unit 12 transmits video communication information of the first user and receives video communication information of the second user. Here, the video communication information includes image and voice information of the first user and the second user.

The first input unit 13 includes a plurality of input keys for operation of the first video communication terminal 10. The first input unit 13 generates a signal according to a key selection of the first user and outputs the signal to the first control unit 11. In particular, the signal input by the first user through the first input unit 13 may be a road guidance request signal while performing video communication with the second video communication terminal 20. The first input unit 13 may be one of a keypad, a touchpad, and a touch screen.

The first memory unit 14 stores programs for operating the first video communication terminal 10 and stores data generated during execution of the programs. Also, the first memory unit 14 stores an application program for providing a road guidance service to the first user during video communication. The first memory unit 14 may include both a Random Access Memory (RAM) and a Read Only Memory (ROM).

The first camera unit 15 obtains image information of the first user to be transmitted through the first wireless communication unit 12. That is, the first camera unit 15 obtains the image information by taking an image of the first user according to an acceptance signal for video communication input through the first input unit 13. The first camera unit 15 includes an image sensor, a signal processing unit, and an image processing unit. The image sensor captures an image of the first user and converts the image to an analog signal. The signal processing unit converts the analog signal to a digital signal. The image processing unit obtains image information by processing the digital signal received from the signal processing unit. The image processing unit then outputs the obtained image information to the first wireless communication unit 12 and to the first display unit 17, and stores the image information in the first memory unit 14. Further, the image processing unit processes image information of the second user received through the first wireless communication unit 12, and outputs the processed image information to the first display unit 17 and stores the processed image information in the first memory unit 14.

The first voice processing unit 16 obtains, according to the control of the first control unit 11, voice information by converting a voice of the first user input through a microphone MIC to a digital signal. The first voice processing unit 16 also demodulates a digital signal of the second user received through the first wireless communication unit 12 and outputs the voice of the second user through a speaker SPK.

The first display unit 17 displays image information being transmitted and received during video communication. In an exemplary implementation, the first display unit 17 displays the image information in real time. In particular, the first display unit 17 displays an image 81a (shown in FIG. 1 and in more detail in FIG. 5) of the second user and an image 83a (shown in FIG. 1 and in more detail in FIG. 5) of the first user simultaneously during video communication. When the first video communication terminal 10 is providing a road guidance service through video communication, the first display unit 17 displays a map including the current location of the first user instead of displaying the image 81a of the second user. The first display unit 17 may be an Liquid Crystal Display (LCD) or a touch screen. If the first display unit 17 is implemented as a touch screen, it may operate both as a display device and as an input device, either in conjunction with or in place of first input unit 13.

When a road guidance service is provided according to the control of the first control unit 11, the first GPS receiver 18 receives satellite signals from a plurality of GPS satellites 40, and calculates the current location of the first video communication terminal 10. In an exemplary implementation, in order to calculate the current location of the first video communication terminal 10, the first GPS receiver 18 receives satellite signals from at least four GPS satellites 40.

In particular, the first control unit 11 requests the second video communication terminal 20 for road guidance according to a signal input by the first user through the first input unit 13 during video communication. For example, the request for road guidance may be performed by selecting a menu icon 19a (shown in FIG. 1 and in more detail in FIG. 5) displayed in the first display unit 17. That is, if the menu icon 19a is selected according to a signal input by the first user through the first input unit 13, a plurality of menu items included in the menu icon 19a are displayed. If a menu item "Request road guidance" or the like is selected from the displayed items, the first control unit 11 requests the second video communication terminal 20 for road guidance. At this time, the first control unit 11 may send a road guidance request message to the second video communication terminal 20.

If a signal accepting the road guidance request is received from the second video communication terminal 20 through the first wireless communication unit 12, the first control unit 11 transmits the current location of the first video communication terminal 10 to the second video communication terminal 20 through the first wireless communication unit 12. Subsequently, if a road guidance voice is received from the second video communication terminal 20 through the first wireless communication unit 12, the first control unit 11 outputs the received road guidance voice through the first voice processing unit 16.

Additionally, if a signal accepting the road guidance request is received, the first control unit 11 controls the first display unit 17 to display a map including the current location of the first communication terminal 10 instead of displaying the image 81a of the second user. That is, if a signal accepting the road guidance request is received, the first control unit 11 receives satellite signals from at least one GPS satellite 40 through the first GPS receiver 18, and calculates the current location of the first communication terminal 10. Subsequently, the first control unit 11 controls the first display unit 17 to display a map including the calculated current location. The map may be displayed in the same area in which the image 81a of the second user was displayed, and replaces the image 81a of the second user.

The first GPS receiver 18 receives the satellite signal through an antenna (ANT2), separate from the antenna (ANT1) of the first wireless communication unit 12 for performing video communication, and may operate at the same time as the first wireless communication unit 12 operates.

In this illustrated exemplary embodiment, if an acceptance signal for the road guidance request is received, the current location of the first video communication terminal 10 is transmitted to the second video communication terminal 10. However, the present invention is not limited thereto. For example, the first video communication terminal 10 may transmit its current location and a map for displaying the current location to the second video communication terminal 20, or may transmit a map including its current location to the second video communication terminal 20.

The second video communication terminal 20 according to the exemplary embodiment of the present invention is described referring to FIGS. 1 and 3. The second video communication terminal 20 includes a second control unit 21, a second wireless communication unit 22, a second input unit 23, a second memory unit 24, a second camera unit 25, a second voice processing unit 26, and a second display unit 27. Although an example of the second video communication terminal 20 that does not have a GPS receiver is disclosed here, the second video communication terminal 20 may also include a GPS receiver.

The second control unit 21 includes a microprocessor for controlling general operation of the second video communication terminal 20. The second control unit 21 controls the provision of a road guidance service during a video communication with the first video communication terminal 10.

The second wireless communication unit 22 performs communication with the first video communication terminal 10. In particular, the second wireless communication unit 22 transmits and receives video communication information for performing video communication through an antenna (ANT). That is, the second wireless communication unit 22 transmits video communication information of the second user and receives video communication information of the first user.

The second input unit 23 includes a plurality of input keys for operation of the second video communication terminal 20. The second input unit 23 generates a signal according to a key selection of the second user and outputs the signal to the second control unit 21. In particular, the signal input by the second user through the second input unit 13 may be a signal accepting a road guidance request while video communicating with the first video communication terminal 10. The second input unit 23 may be one of a keypad, a screen cursor input device such as a touchpad, and a touch screen, or a combination thereof.

The second memory unit 24 stores programs for operating the second video communication terminal 20 and stores data generated during execution of the programs. Also, the second memory unit 24 stores an application program for providing a road guidance service during video communication. The second memory unit 24 may include both a Random Access Memory (RAM) and a Read Only Memory (ROM).

The second camera unit 25 obtains image information of the second user to be transmitted through the second wireless communication unit 22. That is, the second camera unit 25 obtains the image information by taking an image of the second user according to a signal accepting video communication input by the second input unit 22. The second camera unit 25 includes an image sensor, a signal processing unit, and an image processing unit. The image sensor captures an image of the second user and converts the image to an analog signal. The signal processing unit converts the analog signal to a digital signal. The image processing unit obtains image information by processing the digital signal received from the signal processing unit. The image processing unit then outputs the obtained image information to the second wireless communication unit 22 and to the second display unit 27, and stores the image information in the second memory unit 24. Further, the image processing unit processes image information of the first user received through the second wireless communication unit 22, and outputs the processed image information to the second display unit 27 and stores the processed image information in the second memory unit 24.

The second voice processing unit 26 obtains, according to the control of the second control unit 21, voice information by converting a voice of the second user input through a microphone (MIC) to a digital signal. The second voice processing unit 26 also demodulates a digital voice signal of the first user received through the second wireless communication unit 22 and outputs the voice of the first user through a speaker (SPK).

The second display unit 27 displays image information being transmitted and received during video communication. In an exemplary implementation, the second display unit 27 displays the image information in real time. In particular, the second display unit 27 displays an image 83b (shown in FIG. 1 and in more detail in FIG. 5) of the first user and an image 81b (shown in FIG. 1 and in more detail in FIG. 5) of the second user simultaneously during video communication. When the second video communication terminal 20 is providing a road guidance service through video communication, the second display unit 27 displays a map including the current location of the first user instead of displaying the image 83b of the first user. The second display unit 27 may be an LCD or a touch screen. If the second display unit 27 is implemented as a touch screen, it may operate both as a display device and as an input device, either in conjunction with or in place of second input unit 23.

In particular, the second control unit 21 accepts a road guidance request received from the first video communication terminal 10 during video communication, and controls to display a map including the current location of the first video communication terminal 10 instead of displaying the image 83b of the first user. For example, the request for road guidance may be performed by the first user selecting a menu icon 19a displayed in the first display unit 17. That is, if the menu icon 19a is selected according to a signal input by the first user through the first input unit 13, a plurality of menu items included in the menu icon 19a are displayed. If a menu item "Request road guidance" or the like is selected from the displayed items, the first control unit 11 requests the second video communication terminal 20 for road guidance. At this time, the first control unit 11 may send a road guidance request message to the second video communication terminal 20.

The second control unit 21 controls to receive the current location of the first user from the first video communication terminal 10 and displays the current location on a map. The map may be one stored in the second memory unit 24 or may be received from the mobile communication provider's server 30.

If a road guidance request message is received from the first video communication terminal 10, the second control unit 21 controls the second display unit 27 to display the road guidance request message. The second control unit 21 may control to display the road guidance request message in a portion of the screen in which the image 83b of the first user was displayed.

The acceptance of the road guidance may be performed by the second user selecting a menu icon 29a (shown in FIG. 1 and in more detail in FIG. 5) displayed in the second display unit 27. That is, if the menu icon 29a is selected according to a signal input by the second user through the second input unit 24, the second control unit 21 controls to display a plurality of menu items included in the menu icon 29a. If a menu item "Accept road guidance" or the like is selected from the displayed menu items, the second control unit 21 controls to transmit an acceptance signal to the first video communication terminal 10.

In the illustrated exemplary embodiment, the current location of the first video communication terminal is received by the second video communication terminal 20. However, the present invention is not limited thereto. For example, the second video communication terminal 20 may receive the current location of the first video communication terminal 10 and a map for displaying the current location from the first video communication terminal 10, or may receive a map including the current location of the first video communication terminal 10 from the first video communication terminal 10.

The second video communication terminal 20 receives a road guidance voice input by the second user and transmits the road guidance voice to the first video communication terminal 10 through the second wireless communication unit 22.

According to an exemplary embodiment of the present invention, the first user may receive road guidance from the second user by transmitting the current location of the first user from the first video communication terminal 10 to the second video communication terminal 20. In particular, because the second user can guide the first user on a road by viewing the current location of the first video communication terminal 10 on a map, the first user may receive more precise road guidance than by referring only to a map displayed in the first display unit 17. Further, because the current location of the first user is transmitted to the second video communication terminal 20 only according to a request from the first user, an invasion of individual privacy through undesired determination of the first user's location can be avoided.

Figure 4:
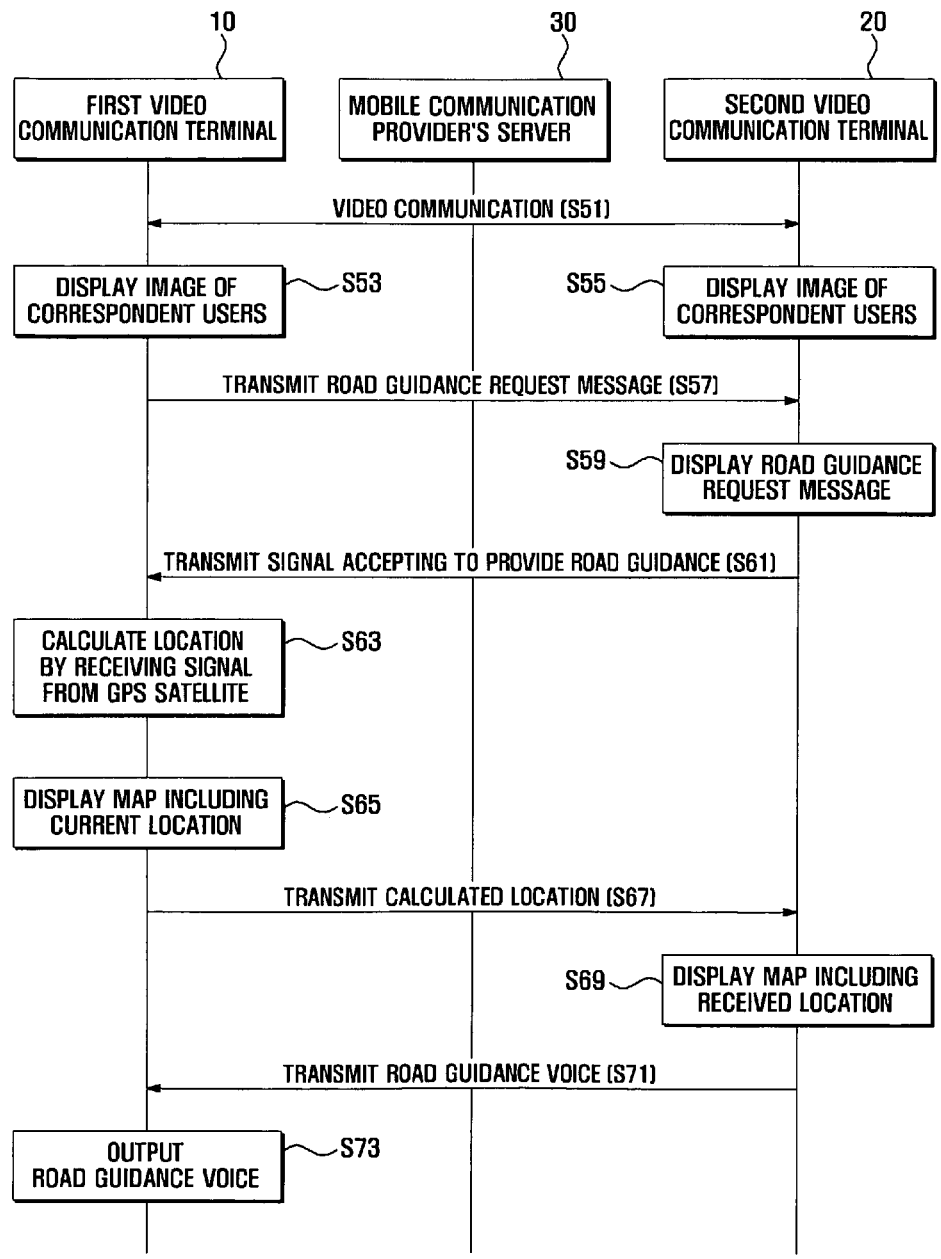
FIG. 4 is a flowchart showing a method of providing a road guidance service using the video communication terminals of FIGS. 2 and 3 according to an exemplary embodiment of the present invention.
Figure 5:
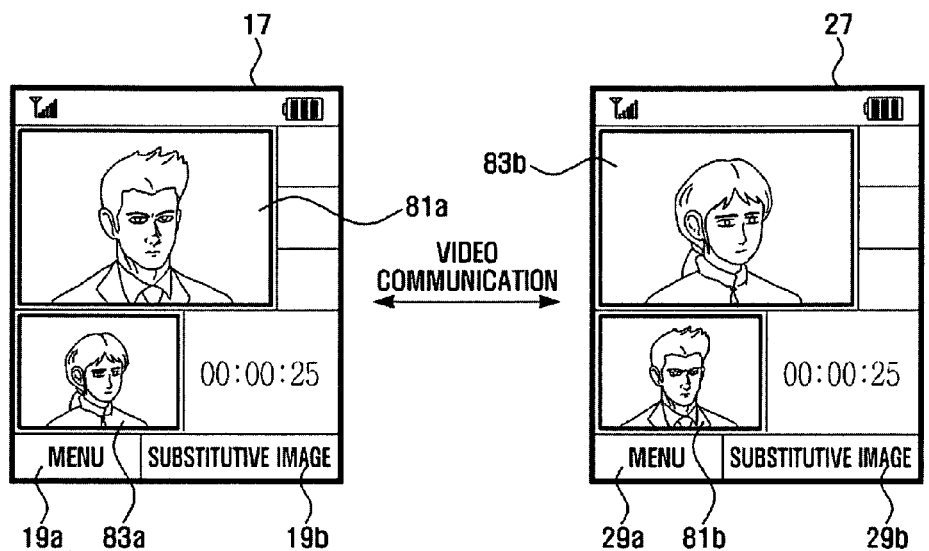
FIGS. 5 to 7 are screen examples displayed in the method of providing a road guidance service of FIG. 4.
Figure 6:
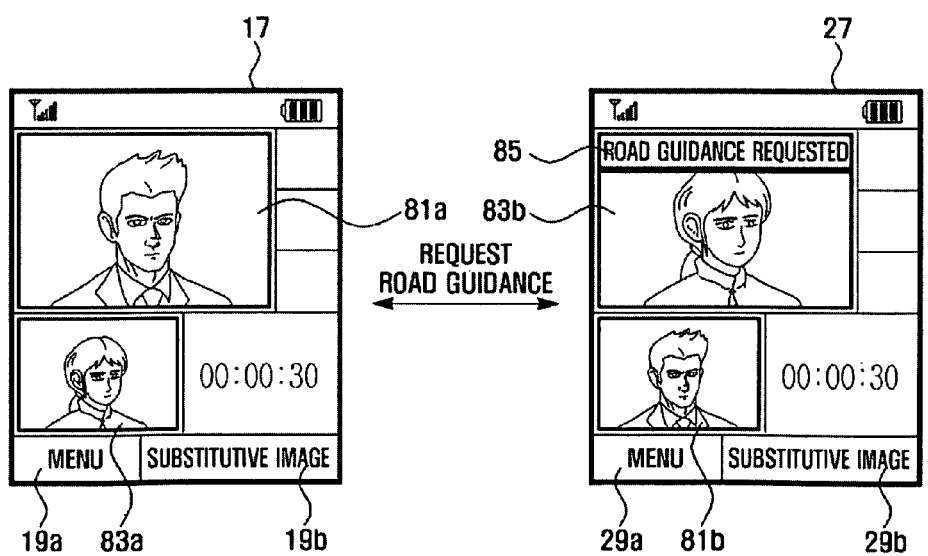
Figure 7:
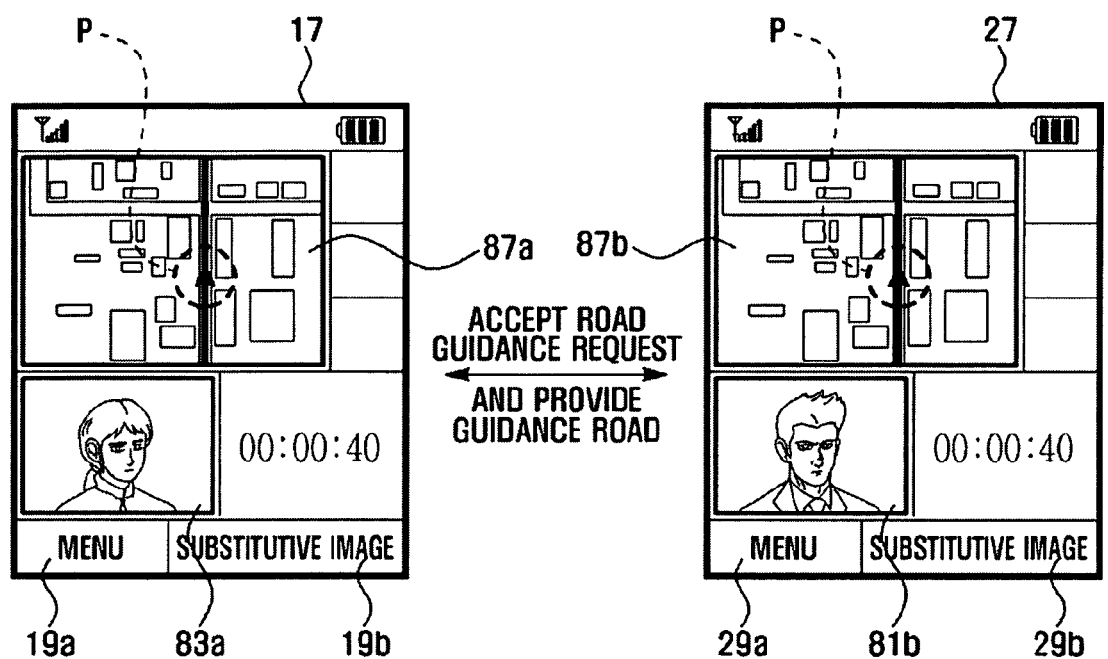

A method of providing road guidance according to an exemplary embodiment of the present invention is described referring to FIGS. 1 to 7. In particular, FIG. 4 is a flowchart illustrating a method of providing a road guidance service using the video communication terminals of FIGS. 2 and 3. FIGS. 5 to 7 are screen examples displayed in the method of providing a road guidance service of FIG. 4.

Referring to FIG. 4, when video communication between the first video communication terminal 10 and the second video communication terminal 20 is relayed by the mobile communication provider's server 30 in step S51, an image 81a of the second user and an image 83a of the first user are displayed in the first video communication terminal 10 in step S53, and an image 83b of the first user and an image 81b of the second user are displayed in the second video communication terminal in step S55, as shown in FIG. 5. Here, the images 81a and 83b of a correspondent user are displayed larger than the images 81b and 83a of the users themselves in the first display unit 17 and in the second display unit 27, respectively. Of course, the size of any of these images may be altered, for example by user selection and input. Additionally, menu icons 19a and 29a for selecting a menu item, and substitutive image icons 19b and 29b, may be displayed in the first display unit 17 and in the second display unit 27, respectively.

The first user requests the second user for road guidance through video communication in step S57. The request for road guidance is performed by selecting the menu icon 19a displayed in the first display unit 17, as shown in FIG. 6. That is, when the menu icon 19a is selected according to a signal input by the first user through the first input unit 13, the first control unit 11 displays a plurality of menu items included in the menu icon 19a. A menu item "Request road guidance" or the like is selected from the displayed menu items, and the first control unit 11 requests the second video communication terminal 20 for road guidance. At this time, the first control unit 11 transmits a road guidance request message to the second video communication terminal 20.

The second video communication terminal 20 displays the received road guidance request message in step S59. That is, when the road guidance request message is received, the second control unit 21 controls the second display unit 27 to display the road guidance request message 85, as shown in FIG. 6. As illustrated, the second control unit 21 may control to display the road guidance request message 85 in a portion of the area where the image 83b of the first user was displayed. Alternatively, the second control unit 21 may control to display the road guidance request message in an unused portion of the screen, in a portion of the area where image 81b of the second user was displayed, or in any other area of the screen as the user may desire.

The second video communication terminal 20 transmits a signal accepting the road guidance request to the first video communication terminal 10 through the video communication in step S61. The acceptance of the road guidance request may be performed by selecting the menu icon 29a displayed in the second display unit 27, as shown in FIG. 6. That is, when the menu icon 29a is selected according to a signal input by the second user through the second input unit 23, the second control unit 21 controls to display a plurality of menu items included in the menu icon 29a. A menu item "Accept road guidance" or the like is selected from the displayed menu items, and the second control unit 21 controls to transmit an acceptance signal to the first video communication terminal 10.

After receiving the acceptance signal, the first control unit 11 calculates the current location of the first video communication terminal 10 by receiving satellite signals from at least one GPS satellite 40 through the first GPS receiver 18 in step S63. Subsequently, the first control unit 11 controls the first display unit 17 to display a map 87a including the calculated current location in step S65, as shown in FIG. 7. The display area of the map 87a may be the area on which the image of the second user (81a of FIG. 6) was displayed at step S53. Alternatively, the map 87a may be displayed in other locations of the first display unit 17, or may be displayed having a size that fills the first display unit 17. In FIG. 7, a symbol "P" displayed on the maps 87a and 87b indicates the current location of the first user.

The first video communication terminal 10 transmits the calculated current location to the second video communication terminal 20 through the video communication in step S67. The second video communication terminal 20 displays the received current location of the first user on the map 87b displayed in the second display unit 27 in step S69, as shown in FIG. 7. The display area of the map 87b may be the area on which the image of the first user (83b of FIG. 6) was displayed at step S55. Alternatively, the map 87b may be displayed in other locations of the second display unit 27, or may be displayed having a size that fills the second display unit 27.

When the first video communication terminal 10 and the second video communication terminal 20 use an identical map, the maps 87a and 87b including the current location of the first video communication terminal 10 may be displayed in the same form. However, if the first video communication terminal 10 and the second video communication terminal 20 display different maps, the maps 87a and 87b including the current location of the first video communication terminal 10 may be displayed in different forms, although both displays are the identical current location of the first video communication terminal 10.

The second video communication terminal 20 receives a road guidance voice from the second user and transmits the voice to the first video communication terminal 10 through the second wireless communication unit 22 in step S71. That is, the user of the second communication terminal 20 inputs directions by speaking into the microphone (MIC) of the second voice processing unit 26. The directions input by the second user are to provide guidance to the first user for better navigation of the map. The second voice processing unit 26 processes the input voice directions and provides the processed directions to the second control unit 21. The second control unit 21 then controls to provide the directions to the second wireless communication unit 22 which in turn transmits the directions the first video communication terminal 10.

The first video communication terminal 10 outputs the road guidance voice received from the second video communication terminal 20 through the first voice processing unit 26 in step S73. Of course, steps S63 through S73 are repeated as necessary. That is, as the first video communication terminal 10 progresses to its destination, its location may be recalculated using GPS signals, the map updated or redisplayed on both the first and second video communication terminals 10 and 20, and the road guidance voice newly transmitted and received based on the new location information of the first video communication terminal 10.

According to exemplary embodiments of the present invention, the first user may receive road guidance from the second user by transmitting the current location of the first user from the first video communication terminal 10 to the second video communication terminal 20. In particular, because the second user can provide road guidance by viewing the current location of the first video communication terminal 10 on a map 87b, the first user may receive more precise road guidance compared to referring only to a map 87a displayed in the first display unit 17. Further, because the current location of the first user is transmitted to the second video communication terminal 20 only according to a request from the first user, an invasion of individual privacy can be avoided.

Although exemplary embodiments of the present invention have been described in detail hereinabove, it should be understood that many variations and modifications of the basic inventive concept herein described, which may appear to those skilled in the art, will still fall within the spirit and scope the exemplary embodiments of the present invention as defined in the appended claims and their equivalents.

What is claimed is:

1. A method of road guidance using a video communication terminal, the method comprising:
   requesting, by a first video communication terminal, road guidance from a second video communication terminal through video communication;
   transmitting, if the first video communication terminal receives a signal accepting to provide the road guidance from the second video communication terminal, a location data of the first video communication terminal to the second video communication terminal; and
   displaying a map including the location of the first video communication terminal in the second video communication terminal.

2. The method of claim 1, wherein the requesting, by the first video communication terminal, of the road guidance from the second video communication terminal comprises:
   displaying an image of the user of the first video communication terminal in the second video communication terminal and displaying an image of the user of the second video communication terminal in the first video communication terminal;
   inputting a signal requesting road guidance to the first video communication terminal and transmitting a road guidance request message from the first video communication terminal to the second video communication terminal; and
   displaying the received road guidance request message in the second video communication terminal.

3. The method of claim 2, wherein the displaying of the received road guidance request message in the second video communication terminal comprises displaying the received road guidance request message on the image of the user of the first video communication terminal in the second video communication terminal.

4. The method of claim 2, further comprising displaying, if the first video communication terminal receives the signal accepting to provide the road guidance, a map including the current location of the first video communication terminal in the first video communication terminal in place of the image of the user of the second video communication terminal.

5. The method of claim 4, wherein the displaying of the map including the current location of the first video communication terminal in the first video communication terminal comprises:
   determining a location data of the first video communication terminal by receiving satellite signals from at least one GPS satellite in the first video communication terminal; and
   displaying the determined location on a map in the first video communication terminal.

6. The method of claim 5, further comprising displaying the map including the location of the first video communication terminal in the second video communication terminal in place of the image of the user of the first video communication terminal.

7. The method of claim 6, wherein the transmitting of the location data of the first video communication terminal to the second video communication terminal comprises transmitting a map for indicating the location of the first video communication terminal, and further wherein the displaying of the map including the location of the first video communication terminal in the second video communication terminal comprises displaying the received location on the received map.

8. The method of claim 6, wherein the transmitting of the location data of the first video communication terminal to the second video communication terminal comprises transmitting a map including the current location of the first video communication terminal, and further wherein the displaying of the map including the location of the first video communication terminal in the second video communication terminal comprises displaying the received map.

9. The method of claim 1, wherein the map including the location of the first video communication terminal comprises at least one of a map stored in the second video communication terminal and a map received from a mobile communication provider's server.

10. The method of claim 1, further comprising outputting a road guidance voice received from the second video communication terminal in the first video communication terminal.

11. A video communication terminal comprising:
    a wireless communication unit for performing video communication with a correspondent video communication terminal;
    a display unit for displaying an image of a user of the correspondent video communication terminal while performing the video communication;
    a Global Positioning System (GPS) receiver for determining the current location of the video communication terminal by receiving satellite signals from at least one GPS satellite;
    an input unit for inputting a road guidance request signal while performing the video communication; and
    a control unit for transmitting the input road guidance request signal to the correspondent video communication terminal through video communication, and for transmitting, if a signal accepting to provide the road guidance request is received from the correspondent video communication terminal through the video communication, the current location to the correspondent video communication terminal through the video communication.

12. The video communication terminal of claim 11, wherein the control unit transmits, if the road guidance request signal is input through the input unit, a road guidance request message to the correspondent video communication terminal.

13. The video communication terminal of claim 11, wherein the control unit controls, if the signal accepting to provide the road guidance is received, the display unit to display a map including the current location in place of the image of the user of the correspondent video communication terminal.

14. The video communication terminal of claim 13, wherein the control unit transmits the current location and a map for indicating the current location to the correspondent video communication terminal.

15. The video communication terminal of claim 13, wherein the control unit transmits a map including the current location to the correspondent video communication terminal.

16. The video communication terminal of claim 11, further comprising a voice processing unit for receiving a road guidance voice from the correspondent video communication terminal through the video communication and outputting the road guidance voice.

17. A video communication terminal comprising:
    a wireless communication unit for performing video communication with a correspondent video communication terminal;
    a display unit for displaying an image of a user of the correspondent video communication terminal while performing the video communication; and a control unit for accepting a road guidance request from the correspondent video communication terminal while performing the video communication and controlling to display a map including the current location of the correspondent video communication.

18. The video communication terminal of claim 17, wherein the control unit controls to display the map including the current location of the correspondent video communication in place of the image of the user of the correspondent video communication terminal.

19. The video communication terminal of claim 17, wherein the control unit displays the road guidance request message received from the correspondent video communication terminal on the image of the user of the correspondent video communication terminal.

20. The video communication terminal of claim 17, wherein the control unit receives a location data of the correspondent video communication terminal and a map for indicating the location.

21. The video communication terminal of claim 17, wherein the control unit receives a map including a location of the correspondent video communication terminal from the correspondent video communication terminal and controls to display the map.

22. The video communication terminal of claim 17, wherein the control unit controls to receive a location value from the correspondent video communication terminal and controls to display the location on a map.

* * * * *